US005674349A

United States Patent [19]

McKinlay et al.

[11] Patent Number: 5,674,349

[45] Date of Patent: Oct. 7, 1997

[54] CORRUGATED PAPERBOARD APPARATUS

[75] Inventors: Peter Robert McKinlay, Doncaster; Neil William Shaw, Sassafras, both of Australia

[73] Assignee: Amcor Limited, Australia

[21] Appl. No.: 498,925

[22] Filed: Jul. 6, 1995

Related U.S. Application Data

[63] Continuation-in-part of Ser. No. 190,148, Feb. 4, 1994, abandoned.

[30] Foreign Application Priority Data

Sep. 17, 1991 [AU] Australia ............................ PK 8359

[51] Int. Cl.[6] ............................ B31F 1/26; B32B 31/08

[52] U.S. Cl. ............................ 156/472; 156/470; 156/471

[58] Field of Search ............................ 156/470, 471, 156/472, 473, 205; 425/336, 369; 264/286

[56] References Cited

U.S. PATENT DOCUMENTS

| | | | |
|---|---|---|---|
| 246,099 | 8/1881 | Dunham . | |
| 258,250 | 5/1882 | Pelham . | |
| 258,251 | 5/1882 | Pelham | 425/369 |
| 1,135,509 | 4/1915 | Ferres | 156/473 |
| 1,184,748 | 5/1916 | Hicks | 156/472 |
| 1,264,506 | 4/1918 | Hahn | 156/473 |
| 1,802,522 | 4/1931 | Moll . | |
| 2,051,319 | 8/1936 | Sieg | 156/472 |
| 2,308,040 | 1/1943 | Anderson | 425/369 |
| 3,608,047 | 9/1971 | Wiggins | 264/286 |
| 4,196,046 | 4/1980 | McConnel | 425/369 |
| 4,935,082 | 6/1990 | Bennettt et al. . | |
| 5,348,610 | 9/1994 | McKinlay et al. . | |

FOREIGN PATENT DOCUMENTS

| | | |
|---|---|---|
| 145854 | 6/1920 | United Kingdom . |
| WO89/09127 | 10/1989 | WIPO . |
| 89/09127 | 10/1989 | WIPO . |

*Primary Examiner*—Michele K. Yoder

*Attorney, Agent, or Firm*—Bell, Seltzer, Park & Gibson, P.A.

[57] ABSTRACT

The invention relates to an improved method and apparatus for producing paper board structures wherein two corrugated mediums are bonded together at their flute tips. End gears (16*a*, 16*b*, 15*a*, 15*b*) are provided, at least, on the ends of the corrugating rolls (4,6), which are non-meshing with each other and which assist in aligning the corrugated mediums in tip to tip arrangement and provide precise tip to tip bonding of the mediums. The end gears may be abutting or non abutting and may be provided on both ends of the corrugating rolls, which assist in aligning the mediums to obtain precise tip to tip bonding.

10 Claims, 2 Drawing Sheets

CORRUGATED PAPERBOARD APPARATUS

This application is a continuation-in-part of U.S. Ser. No. 08/190,148, filed Feb. 4, 1994 now abandoned.

This invention relates to improved methods of and apparatus for forming paper board structures in which two corrugated mediums are bonded together at their flute tips and aligned by non-meshing rollers. A structure of this kind is disclosed in U.S. Pat. No. 4,886,563 which is incorporated herein by reference.

BACKGROUND OF THE INVENTION

One apparatus for forming such corrugated board structures is disclosed in Australian Patent No. 609089 (11926/88) which is also incorporated herein by reference. Additionally there are variations of the basic apparatus as is currently disclosed in U.S. Pat. No. 5,348,610 which discloses the 4-roll apparatus wherein one of the corrugating rolls functions also as a carrier roll which transfers the bonded mediums to the liner bonding zone and also U.S. Pat. No. 4,935,082 which replaces the carrier roll with the toothed belt. The invention as described and defined herein is equally applicable to the variations of the basic apparatus; wherein flute tip to flute tip bonding is required.

As was described in U.S. Pat. No. 4,886,563 the improved board structure disclosed therein exhibits its improved strength characteristics and crush resistance as a result of the flute tip to flute tip bonding of the corrugated mediums. The flute tip to flute tip bonding is achieved through a combination of heat and pressure. The pressure line of bonding lies between two rounded flute tips of radii which can be as low as 0.033 inches and thus the pressure creates extreme lateral forces under dynamic conditions leading to misalignment of the flute tips. In particular, it was observed that at operating speeds greater than 30–40 metres of board product/minute and in particular, at the desired commercial production speeds of 100–120 metres of board product/minute and more preferably, 150–200 metres of board product/minute, precise alignment of the flute tips of the non-meshing corrugating rolls and the corrugated mediums was extremely difficult to obtain. As the adhesive or glue is placed centrally on the tip of one of each pair of flutes to be bonded, the misalignment results in contact and bonding between the flute tips being transferred to one side of the glue bead resulting in poor tip-to-tip (pin) adhesion. Bonding strength between the flutes at this point is significantly decreased leading to reduced crush resistance and overall strength of the board.

The pressure required to effect the flute tip to flute tip bond is set at a level where the maximum possible heat transfer can occur and the paper sheets are not damaged. This pressure level can be as high as 50–60% of that required to corrugate the paper in the preceding pairs of meshed corrugating rolls and must be maintained at a uniform level across the full width of the paper sheets being processed. The lateral forces which cause the misalignment of the flutes are large and arise from the geometry of the small flute tip radii. The lateral forces also create torsional loads on the rolls which move circumferentially relative to each other, thus displacing the flute tip to flute tip alignment.

During the operation of the apparatus and method disclosed in the abovementioned patents it was discovered that the precise alignment of flute tips was extremely difficult to maintain at commercial production speeds, due to a number of factors. These factors included rigidity of the rolls themselves, strength of the roll trunnions, movement of the roll shafts in their bearings, flexure of the machine frames, torsional rigidity of the gear train shafts, cumulative backlash in the gear train and variation in position of the rolls relative to each other due to heating of the rolls, shafts and frames under varying production levels.

Numerous attempts were made to overcome the problem of misalignment of the flute tips of the non-meshing corrugating rolls and hence the corrugated board, during operation of the apparatus at commercial production speeds. These have included modification to the frame to isolate the effect of frame movement due to temperature change, reduction in gear clearances to absolute minimum backlash settings and reduction in fitting tolerances to reduce clearances between components. Additionally helical gears were used in the external gear train which by axial movement improved the precision of the flute tip to flute tip alignment. However, none of these attempts solved the problem of misalignment at commercial production speeds. Additionally, a high precision geared adjusting mechanism was used to control this axial movement, however, despite the high gearing of the adjusting mechanism the lateral forces were sufficient to reverse the adjusting mechanism.

It is, therefore, an object of the present invention to ensure that precise alignment of flute tips is obtained under static conditions and maintained under dynamic conditions during commercial production when high displacing forces are present. Manufacture of the double medium corrugated board with the required strength can only be obtained when flute tips are precisely aligned and when bonding with an even spread of glue at each edge of the cross machine glue line is obtained.

SUMMARY OF THE INVENTION

This invention provides an improvement in the basic apparatus and method and also the variations of the same as previously discussed.

The invention therefore provides a corrugated board making apparatus capable of forming corrugated boards having two precisely aligned fluted mediums bonded precisely together at the flute tips, comprising

- at least two pairs of corrugating rolls wherein a corrugating roll of one pair of corrugating rolls is arranged so that the flutes of that roll are precisely aligned tip to tip with the flutes of a corrugating roll of another pair of corrugating rolls enabling bonding of the two fluted mediums precisely tip to tip and wherein
- the corrugating rolls whose flutes are precisely aligned tip to tip are non-meshing and have cooperating end gears mounted thereon to ensure that precise alignment of the flute tips of the corrugating rolls and hence precise bonding of the flute tips of the fluted mediums is obtained under static conditions and maintained during commercial production under dynamic conditions when high displacing forces are present.

More preferably, a set of end gears is fitted to each end of the said corrugating rolls abutting the fluted faces of said rolls.

The present invention is predicated on the discovery that the problem of maintaining the corrugating rolls flute tip to flute tip arises from the fact that the entire board making apparatus can generally lack rigidity. As discussed above it was discovered that the lack of rigidity was mainly attributable to a number of factors including the lack of rigidity in the support frame and also in the corrugating rolls and shafts which twist during operation. Thus as a result of movement of the corrugating rolls and the frame the flute tips of the rolls become misaligned.

The provision of the co-operating end gears advantageously and surprisingly aids in overcoming the lateral forces and torsional load and thus assists in maintaining precise alignment of the flute tips of the non-meshing corrugating rolls to each other. In particular, surprisingly with the use of end gears the flute tips of the non-meshing rolls are aligned precisely within tolerances of +/−0.0005 inches (12.7 microns) at production speeds of up to 190 metres/minute. Thus the alignment of the flute tips of the respective corrugated mediums is achieved, which is essential in order to obtain consistent enhancement of board performance (such as strength and crush resistance) and maximum reduction in medium and liner weights. The benefits of providing this type of board structure are set out in U.S. Pat. No. 4,886,563.

End gears are preferably but not essentially fitted to each end of each pair of central corrugating rolls and consist of one full face gear and one split face gear to allow adjustment of backlash.

The end gears are preferably abutting end gears or are preferably installed a short distance from the grooved face of each corrugating roll advantageously assisting in reducing the twisting of shafts. The use of abutting end gears allows the use of conventional corrugating rolls with standard sized trunnions and minimises the torsional deflection which generally occurs. By providing abutting end gears to both ends of the corrugating rolls the general rigidity of the apparatus and the reduction in the twisting of the shafts is further enhanced.

The end gears may be non-abutting end gears or can be fitted outside the vacuum collectors, if fitted, and also outside the machine frames. Non-abutting gears can be used when the corrugating rolls have larger trunnions and thus the ability to resist the high torsional stresses arising from the point to point pressure occasioned during the tip to tip bonding process.

The end gears are preferably precision ground so that the intermeshing is precise.

The end gears can be spur gears or helical gears.

The gears may be split. If there are gears provided at each end they are preferably split at each end. The split gear may then mate with a gear of larger face width on the other corrugating roll. This arrangement assists in taking up backlash and allows transmission of at least 50% of the applied torque, thus preventing, further the twisting of the corrugating rolls and shafts.

When the helical gears are used as abutting end gears, the fitting of shims between the end faces of the corrugating rolls and the helical gears may be required when the helical gears are adjusted axially.

If helical gears are fitted to both ends of the roll, the helices on each gear can be opposing to ensure thrust forces cancel each other out. If helical gears are only fitted to one end, additional thrust bearing capacity may be required to counteract the axial thrust created by the helical gears and prevent twisting of the corrugating rolls and shafts out of tip to tip alignment.

The invention also provides a method of forming improved corrugated boards having two fluted mediums bonded together at the flute tips wherein the two fluted mediums are aligned precisely for flute tip to flute tip bonding by corrugating rolls which meet flute tip to flute tip, are non-meshing with each other and wherein said corrugating rolls have cooperating end gears thereon to ensure that precise alignment of the flute tips of the corrugating rolls and hence precise bonding of the flute tips of the fluted mediums is obtained under static conditions and maintained during commercial production under dynamic conditions when high displacing forces am present.

DETAILED DESCRIPTION OF THE INVENTION

A preferred embodiment of this invention will now be described with reference to the drawings.

Figure 1:
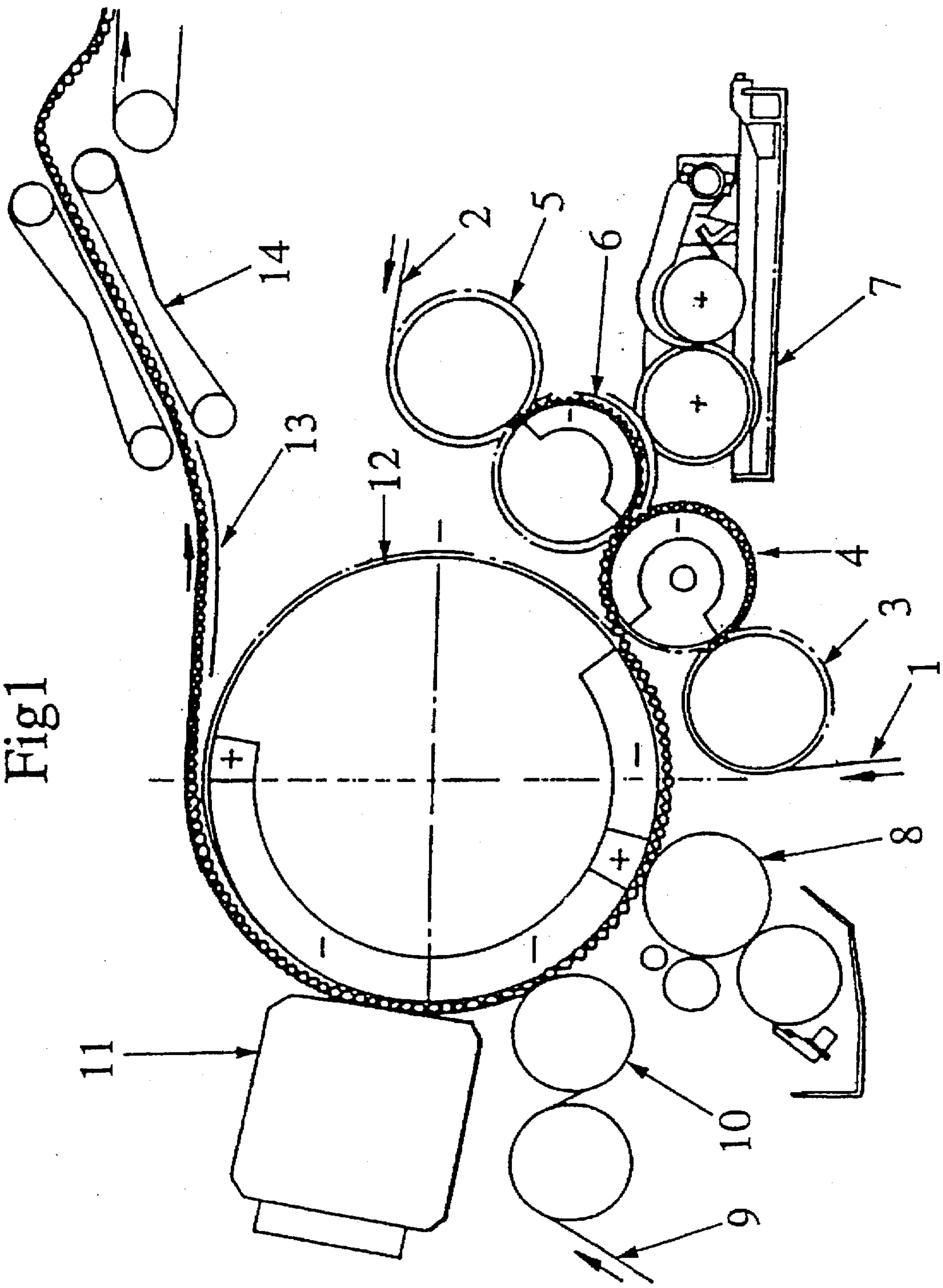
FIG. 1 shows a schematic view of a single facer unit of the kind disclosed in Australian Patent No. 609089.

FIG. 1 illustrates a single racer unit of the kind disclosed in Australian Patent No. 609089. The corrugating medium, 1 and 2, maintained on mill roll stands (not shown) and generally passed over a preheater (not shown) is fed onto one (items 3 and 5) of a pair of corrugating rolls, 3 and 4 and 5 and 6. The medium, 1 and 2, is corrugated and then adhesive is applied to at least one of the surfaces of 1 or 2, by an adhesive station 7. The corrugated medium, 1 and 2, is then joined together flute tip to flute tip, when brought together by corrugating rolls 4 and 6 which are non-meshing with each other. The two combined corrugating mediums are fed onto the carrier roll 12 and after glue is applied to the flute tips, they are transported to the bonding zone wherein the liner 9 is brought into contact with the flute tips and heat applied by heater 11. The carrier rolls 12 then transports the combined liner and mediums to a point where the product is fed into an inclined transport conveyor 14 for discharge on to the corrugator bridge.

In accordance with variations of the basic apparatus, it is noted that the carrier roll 12 can be substituted with a toothed belt.

Figure 2:
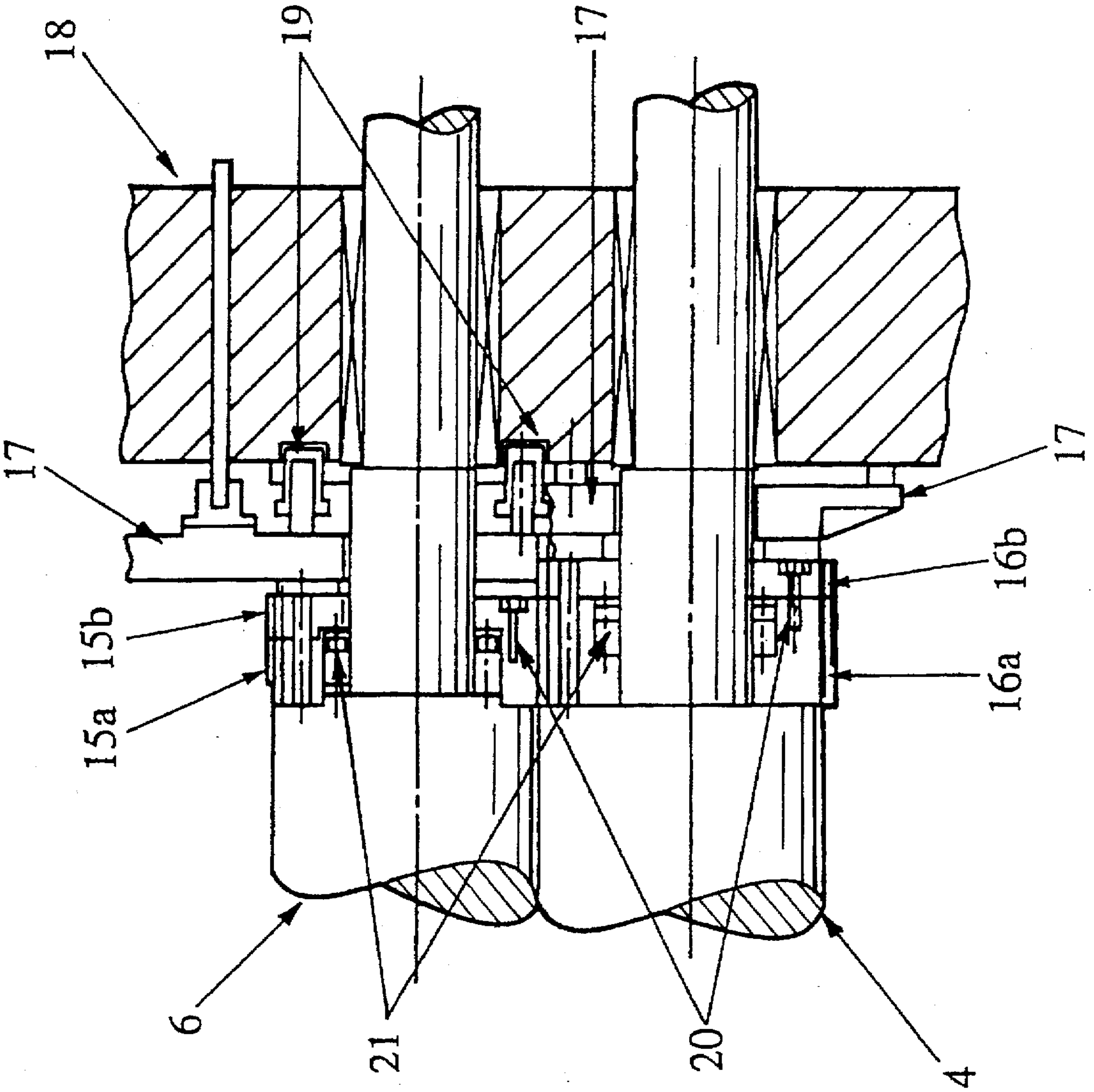
FIG. 2 shows a cross-section view of the corrugating rolls with abutting end gears attached.

FIG. 2 illustrates an embodiment of the present invention, wherein end gears 15A and 15B and 16A and 16B are fixed to the corrugating rolls 4 and 6 of the single facer unit which are the corrugating rolls which align and bond the corrugated medium in flute tip to flute tip arrangement. Corrugating rolls 4 and 6 are non-meshing with each other. Advantageously, with the provision of end gears 15A and 15B and 16A and 16B on non-meshing corrugating rolls 4 and 6 precise alignment (previously thought not possible at all) is obtained within tolerances of +/−0.0005 inches (12.7 microns).

It should be noted that in the art of intermeshing rolls and in particular, intermeshing corrugating rolls it has been known to use end gears to adjust the clearance between the intermeshing rolls such that there is a reduction in the wear and tear of the intermeshing flutes of the rolls. Also end gears have been used in the art of intermeshing rolls to attempt to reduce backlash and thus reduce the likelihood of the paper web that is being corrugated from fracture or damage. By way of examples of the use of end gears in the intermeshing art, reference is made to U.S. Pat. No. 4,196,046.

However, by comparison with the art of flute tip to flute tip bonding of corrugated mediums which uses non-meshing rolls (with each other) to align the mediums, in the art of intermeshing rolls, there is no need to ensure that specific flute tip to flute tip alignment is achieved or that the surface speeds of the corrugating rolls are synchronised. It is inherent in the art of intermeshing rolls that the surface speeds of the rolls at the flute tips are at the same speed and there is no need for the flute tips to be precisely aligned. Thus further mechanisms to ensure that the flute tips of the corrugating rolls are precisely aligned and that the speeds are synchronised are not necessary or required.

The embodiment of the present invention illustrates the use of the split spur gears 15A and 15B and 16A and 16B abutting the corrugating rolls 4 and 6. It should be noted that in order to maximise the rigidity of the apparatus and the reduction of twisting in the aligning corrugating rolls, end gears should be placed at each end of the aligning non-meshing corrugating rolls. The end gears 15A and 15B and 16A and 16B in this embodiment fit within the space between the vacuum collector 17 and the corrugating rolls 6 and 4. It should be noted that if repetitive wear patterns on the corrugating rolls are not acceptable, space can be allowed so all four corrugating rolls may be able to move axially relative to each other. The vacuum collectors 17 and connections therefrom to the corrugating rolls 4 and 6 can pass through the end gears 15A, 15B, 16A and 16B to communicate with the corrugating rolls 6 and 4. The vacuum collectors 17 are spring-loaded by spring arrangement 19 to ensure a secure but resilient contact between the end gears (15A, 15B, 16A and 16B) and the vacuum collector system 17.

The end gears need not always abut the corrugating rolls and this is dependent on the diameter of the corrugating rolls with larger diameter shafts. In larger diameter rolls, which can be used when flutes of greater height and lower flute pitch are required, the end gears need not abut the rolls and can be even housed outside of the main housing. Furthermore, when vacuum is not used to assist in retaining and carrying the cardboard on the corrugating roll and the alternative fingers are used, it is possible to separate the end gears away from the corrugating rolls, since larger rolls can be used.

In order to produce a particular flute, for example that disclosed in Australian Patent No. 567833, the diameter of the corrugating rolls and shafts may be limited in order to produce the desired flute pitch and depth. In these cases it may be necessary to abut the end gears in order to maximise the rigidity of the apparatus.

Furthermore, the face width of split spur gear 16A is extended to assist in taking up backlash and allow transmission of the applied torque. Generally the face width of the end gears is governed by the braking torque required which as a general rule is at least three (3) times the drive torque created. End gear 16A and 16B is driven by its cooperation with end gears 15A and 15B and drives the carrier rolls 12 via a ring gear (not shown) attached to the carrier roll 12. Similarly the end gears can drive a toothed belt if used.

The end gears 15A and 15B and 16A and 16B may be fixed to the shafts of the corrugating rolls 4 and 6 by any locking assembly, for example multi-taper lock sleeves, item 21. The only requirement of the locking assembly is that the gears are precisely retained in position to transmit high peripheral forces without circumferential movement.

To secure the split gears 15A and 15B to each other fixing screws 20 may be used which also allow for adjustment of the gears relative to each other in order to reduce backlash. Similarly fixing screws 20 can also be incorporated on split gears 16A and 16B. The end gears 15A, 15B, 16A and 16B depending on their proximity to the corrugating rolls may have a shroud (not shown) shielding the board being processed and preventing entanglement of the board in the rotating end gears.

It is noted that whilst the end gears must be applied to at least the corrugating rolls which are directly involved in flute-tip to flute-tip bonding, end gears can be applied to other rolls such as carrier rolls, or toothed belt mechanisms.

The frame 18 may also be reinforced and/or improved in order to increase frame rigidity and thus generally greater apparatus rigidity.

The above improvements to existing machinery, aid and assist in providing a better board product which exhibits the improved strength and properties discussed in U.S. Pat. No. 4,886,563, and produces the board product more efficiently resulting in reduced machine wear and raw material use.

We claim:

1. A corrugated board making apparatus capable of forming corrugated boards having two fluted mediums bonded together at the flute tips, comprising at least two pairs of corrugating rolls, each having longitudinally extending flutes spaced apart around the periphery thereof, said rolls being mounted on trunnions and wherein a first corrugating roll of one pair of corrugating rolls is arranged so that the flutes of that roll are precisely aligned tip to tip with, and are thus non-meshing with, the flutes of a second corrugating roll of another pair of corrugating rolls enabling bonding of the two fluted mediums precisely tip to tip, said first and second corrugating rolls whose flutes are aligned tip to tip being subject to forces tending to cause misalignment of the flutes thereof through torsional flexure of said first and second corrugating rolls, and meshing end gears mounted on said trunnions at and in abutting relation with opposite ends of said first and second corrugating rolls to interconnect opposite ends of said first and second corrugating rolls for synchronous rotation and to resist torsional flexure thereof to ensure that precise alignment of the flute tips of said first and second corrugating rolls and hence precise bonding of the fluted mediums is obtained under static conditions and maintained during commercial production under dynamic conditions when high displacing forces are present.

2. The apparatus according to claim 1 wherein the surface speeds of the corrugating rolls whose flutes are precisely aligned tip to tip are non-meshing have identical surface speeds.

3. The apparatus according to claim 1 wherein the end gears are spur gears or helical gears.

4. The apparatus according to claim 1 wherein at least one end gear is split.

5. The apparatus according to claim 4 wherein one gear on one corrugating roll has a wider face and the split end gear co-operates with said wider face gear so as to assist in taking up backlash.

6. The apparatus according to claim 1 which comprises a vacuum collector, a space is provided between said vacuum collector and two corrugating rolls and said end gears are fitted in said space.

7. The apparatus according to claim 1 which comprises a carrier roll and end gears am also applied to said carrier roll.

8. A corrugated board making apparatus capable of forming corrugated boards having two fluted mediums bonded together at the flute tips, comprising at least two pairs of corrugating having longitudinally extending flutes spaced apart around the periphery thereof, said rolls being mounted on trunnions and wherein a first corrugating roll of one pair of corrugating rolls is arranged so that the flutes of that roll are precisely aligned tip to tip with, and are thus non-meshing with, the flutes of a second corrugating roll of another pair of corrugating rolls enabling bonding of the two fluted mediums precisely tip to tip, said first and second corrugating rolls being subject to forces tending to cause misalignment of the flutes thereof through torsional flexure of said first and second corrugating rolls, and meshing end gears mounted on said trunnions in spaced relation to opposite ends of said first and second corrugating rolls while being substantially rigidly connected to said first and second corrugating rolls to interconnect opposite ends of said first and second corrugating rolls for synchronous rotation and to resist torsional flexure thereof to ensure that precise alignment of the flute tips of said first and second corrugating rolls and hence precise bonding of the fluted mediums is obtained under static conditions and maintained during commercial production under dynamic conditions when high displacing forces are present.

9. An apparatus according to claim 8 wherein said meshing end gears comprise helical gears.

10. An apparatus according to claim 8 wherein said meshing end gears comprise spur gears.

* * * * *

UNITED STATES PATENT AND TRADEMARK OFFICE

CERTIFICATE OF CORRECTION

PATENT NO. : 5,674,349

DATED : October 7, 1997

INVENTOR(S) : McKinlay et al.

It is certified that error appears in the above-identified patent and that said Letters Patent is hereby corrected as shown below:

On the face of patent, Column 1, under U.S. Patent Documents, line 2, delete "258,250 5/1882 Pelham";

On the face of patent, Column 2, under U.S. Patent Documents, line 7, "Bennettt" should be -- Bennett --;

On the face of patent, Column 2, under Foreign Patent Documents, line 3, delete "89/09127 10/1989 WIPO.";

Column 4, line 4, "am" should be -- are --;

Column 4, line 15, "racer" should be -- facer --;

Column 6, line 55, "am" should be -- are --; and

Column 6, line 59, after "corrugating" insert the words -- rolls, each --.

Signed and Sealed this

Fifth Day of May, 1998

Attest:

BRUCE LEHMAN

*Attesting Officer* — *Commissioner of Patents and Trademarks*